(12) United States Patent
Grossmann

(10) Patent No.: US 6,311,591 B1
(45) Date of Patent: Nov. 6, 2001

(54) MACHINE TOOL

(75) Inventor: Walter Grossmann, Baltmannsweiler (DE)

(73) Assignee: Index-Werke GmbH & Co. KG Hahn & Tessky, Esslingen (DE)

( * ) Notice: Subject to any disclaimer, the term of this patent is extended or adjusted under 35 U.S.C. 154(b) by 0 days.

(21) Appl. No.: 09/502,139

(22) Filed: Feb. 11, 2000

(30) Foreign Application Priority Data

Feb. 12, 1999 (DE) ............................................. 199 05 772
Mar. 12, 1999 (DE) ............................................. 199 10 953

(51) Int. Cl.$^7$ ..................................................... B23B 3/30
(52) U.S. Cl. .................................. 82/121; 82/122; 82/129
(58) Field of Search .............................. 82/121, 120, 122, 82/129, 146, 159; 409/201, 211, 200

(56) References Cited

U.S. PATENT DOCUMENTS

| | | | |
|---|---|---|---|
| 4,187,601 | * | 2/1980 | Aldrin ............................... 409/201 X |
| 5,490,307 | | 2/1996 | Link . |
| 5,533,846 | * | 7/1996 | Geissler .................................. 409/201 |
| 5,664,308 | | 9/1997 | Deitert ...................................... 29/40 |
| 5,697,739 | * | 12/1997 | Lewis et al. .......................... 409/230 |
| 5,718,545 | * | 2/1998 | Husted .................................. 409/201 |
| 5,807,044 | * | 9/1998 | Watari et al. .......................... 409/183 |
| 6,128,812 | * | 10/2000 | Link et al. .......................... 82/159 X |

FOREIGN PATENT DOCUMENTS

| | | |
|---|---|---|
| 32 21 513 | 12/1983 | (DE) . |
| 44 17 398 | 11/1995 | (DE) . |
| 0 538 515 | 4/1993 | (EP) . |

* cited by examiner

*Primary Examiner*—Henry Tsai
(74) *Attorney, Agent, or Firm*—Barry R. Lipsitz; Douglas M. McAllister

(57) ABSTRACT

In order to improve a machine tool comprising a machine frame, at least one workpiece receiving means which can be rotated about an axis and fixed in a defined rotary position, a tool carrier arrangement, with a rotatingly driven tool which can be moved by means of a control and aligned such that the tool spindle axis is located in planes intersecting the axis and forming with this axis an angle in the range of approximately 0° to approximately 90°, in such a manner that the distances to be traveled can be reduced it is suggested that the tool carrier arrangement comprise a tool spindle carrier which can be pivoted about a pivot axis in relation to a bearing housing, can be fixed on the bearing housing in at least one machining position and extends only on one side of the pivot axis in an angular range of less than 180° around the pivot axis and away from it and that the tool spindle be arranged on the tool spindle carrier such that its tool spindle axis is in a position non-coaxial to the pivot axis.

39 Claims, 13 Drawing Sheets

MACHINE TOOL

BACKGROUND OF THE INVENTION

The invention relates to a machine tool, comprising a machine frame, at least one workpiece receiving means which is rotatable about an axis and can be fixed in a defined rotary position and in which a workpiece can be accommodated for the machining, a tool carrier arrangement which comprises a tool spindle for receiving a tool which is driven for rotation about a tool spindle axis, can be moved transversely to the axis and in the direction of the axis by means of a control and can be aligned, in addition, in the space such that the tool spindle axis is located in planes intersecting the axis and forming with this axis an angle in the range of approximately 0° to approximately 90°.

A machine tool of this type is known, for example, from European patent application 0 538 515.

With a machine tool of this type there is the problem of the tool spindle axis being arranged on the tool carrier arrangement comprising a turret such that during machining of a workpiece with a tool seated in the tool spindle and driven for rotation by it considerable traveling distances for the movement of the rotatingly driven tool into a machining position and out of this into a rest position have to be overcome.

The object underlying the invention is therefore to improve a machine tool of the generic type in such a manner that the distances to be traveled can be reduced.

SUMMARY OF THE INVENTION

This object is accomplished in accordance with the invention, in a machine tool of the type described at the outset, in that the tool carrier arrangement comprises a tool spindle carrier which is pivotable about a pivot axis in relation to a bearing housing and can be fixed on the bearing housing in at least one machining position, this tool spindle carrier extending only on one side of the pivot axis in an angular range of less than 180° around the pivot axis and away from it and that the tool spindle is arranged on the tool spindle carrier such that its tool spindle axis is in a position non-coaxial to the pivot axis.

The advantage of the inventive solution is to be seen in the fact that with the provision of the pivotable tool spindle carrier it is possible to position the bearing housing at an adequately large distance from the workpiece and to bridge the distance from the bearing housing to the workpiece by pivoting the workpiece spindle carrier relative to the bearing housing so that, on the one hand, it is possible to machine the workpiece on all sides with the rotatingly driven tool and, on the other hand, it is possible to pivot the rotatingly driven tool away from the workpiece by pivoting the tool spindle carrier, namely onto a position, in which neither the rotatingly driven tool nor the tool spindle carrier hinder other machining operations, which is also possible, in particular, due to the fact that the tool spindle carrier extends in an angular range of less than 180° around the pivot axis, as a result of which the possibility is created of aligning the tool spindle carrier such that this does not extend with any of its areas closer in the direction of the workpiece than the bearing housing of the tool carrier.

As a result, a simple possibility is already created, without utilizing the movability of the bearing housing, of being able, on the one hand, to carry out all the desired machinings on the workpiece with the rotatingly driven tool and, on the other hand, of bringing the rotatingly driven tool without any problem into a position, in which this does not hinder further machinings, without any movement of the bearing housing over large distances being necessary, as is the case with the state of the art described at the outset.

An even more advantageous solution provides for the tool spindle carrier to extend in an angular range of less than 120°, even better less than 90°, around the pivot axis so that, as a result, a position, in which the tool spindle carrier does not come closer to the workpiece than the bearing housing, can already be reached as a result of an even smaller rotation of the tool spindle carrier about the pivot axis.

In order, in particular, to be able to use tool spindles which make a large metal-removing capacity available it is preferably provided for the tool spindle carrier to comprise a tool spindle housing which mounts the tool spindle and is an integral section of the tool spindle carrier. This means that the tool spindle housing is part of the tool spindle carrier and is not intended, like, for example, a tool holder, to be connected to the tool spindle carrier so as to be interchangeable.

As a result of the integration of the tool spindle housing in the tool spindle carrier, a receiving means for the tool spindle, in particular, a tool spindle for large metal-removing capacities may be created which does, on the one hand, save on space and, on the other hand, is stable.

With respect to the design of the tool spindle carrier itself, no further details have so far been given. One advantageous embodiment, for example, provides for the tool spindle carrier to comprise a bearing head penetrated by the pivot axis, an arm extending away from the bearing head and a tool spindle housing connected to the arm. Such a solution has great advantages, in particular, on account of its space-saving construction.

The solution is especially space-saving, in particular, when the arm of the tool spindle carrier extends solely between the tool spindle housing and the bearing head, i.e. merely forms a connection between them and does not extend sideways beyond them. This solution is the most space-saving solution.

It is, however, also conceivable to design the tool spindle carrier in such a manner that the arm extends from the bearing head to the tool spindle housing and also to one or several additional tool receiving means which are, for example, arranged at an angular distance in relation to the tool spindle housing. These additional tool receiving means can likewise be additional tool spindle housings. It is, however, also conceivable to design these receiving means as simple receiving means for stationary tools.

With respect to the fixing of the tool spindle carrier in position relative to the bearing housing, it has so far merely been assumed that at least one machining position is provided so that when, for example, one workpiece spindle is provided the tool spindle carrier can be fixed in one machining position relative to it and, in addition, can be moved into a rest position, in which a fixing in position which is stable with respect to momentum is not, however, absolutely necessary.

It is, however, even more advantageous when the tool spindle carrier can be fixed in at least two machining positions in relation to the bearing housing since these two machining positions can be used to carry out all the possible machinings in a simple manner and, in particular, avoiding long paths of travel during the movement of the tool carrier arrangement relative to the workpiece of a workpiece receiving means, wherein in one machining position the tool spindle axis moves in planes which intersect the axis and form with it an angle of less than 45° whereas in the other machining position the tool spindle axis is located in all the planes which intersect the axis and form with it an angle of more than 45°.

These two intended machining positions may be arranged particularly favorably when they are arranged on opposite sides of a plane of symmetry extending through the pivot axis. In this respect, it is not absolutely necessary to provide the machining positions at an angular distance of approximately 180° from one another. The inventive advantages can also occur at smaller angular distances. It is, however, particularly favorable, in order to be able to use the tool overall on the workpiece with the greatest possible distance between workpiece and bearing housing, when the at least two machining positions are arranged so as to be turned about the pivot axis through approximately 180° in relation to one another.

In principle, it would be conceivable to arrange the tool spindle carrier such that it is rotatable about the pivot axis by more than one rotation. This would, however, result from a constructional point of view in the tool spindle carrier and, in particular, the arrangement of the tool spindle having to be selected such that these can be moved past the bearing housing which, again, would result in a large constructional space for the entire tool carrier. For this reason, it is preferably provided for the tool spindle carrier to be rotatable about the pivot axis by less than one rotation.

A particularly favorable solution provides for the tool spindle carrier to be pivotable about the pivot axis through an angle of at the most 270°, even better at the most 240°, so that the tool spindle carrier can be designed with the tool spindle housing such that the constructional space for the entire tool carrier is as small as possible.

With respect to the fixing of the tool spindle carrier on the bearing housing, no further details have been given in conjunction with the preceding explanations concerning the individual embodiments. It would, for example, be conceivable to provide a pivot drive and to fix the tool spindle carrier in position relative to the bearing housing simply via the stationary pivot drive. It is, however, particularly favorable when the tool spindle carrier can be fixed on the bearing housing with a fixing device so that the fixing of the tool spindle carrier relative to the bearing housing can be brought about independently of the rotary drive thereof.

In this case it is, in particular, possible to use the drive for the tool spindle as well for driving the pivoting movement of the tool spindle carrier relative to the bearing housing so that only one drive is necessary for the tool spindle and for bringing about the pivoting movement of the tool spindle carrier respectively required which has, in particular, an advantageous effect on the constructional simplicity of the solution and, in addition, on the constructional size of such a solution.

With respect to the fixing of the tool spindle carrier relative to the bearing housing, a force-locking fixing in position would, in principle, be conceivable and this would have the advantage that any optional fixing of the tool spindle carrier relative to the bearing housing would be possible within the scope of the pivoting range allowed.

It has, however, proven to be particularly advantageous, especially with respect to a stable relative fixing of the tool spindle carrier in relation to the bearing housing, when the tool spindle carrier can be positively fixed on the bearing housing with the fixing device. This positive fixing in position relative to the bearing housing also has the additional advantage that with it a high precision can be achieved with respect to the positioning of the tool spindle carrier relative to the bearing housing.

In this respect, the fixing device is preferably designed such that it comprises teeth engaging in one another.

With respect to the arrangement of the tool spindle axis relative to the pivot axis, no further details have been given in conjunction with the preceding explanations concerning the individual embodiments. It would, for example, be conceivable for the tool spindle axis and the pivot axis to extend in a skewed manner relative to one another. It would, for example, be possible to align the tool spindle axis in planes which do intersect the pivot axis but form an angle with it.

It would, for example, be conceivable to position the tool spindle axis in a plane which is at right angles to the pivot axis.

Arrangements which are even more favorable may, however, be achieved when the tool spindle axis is located in a plane which intersects the pivot axis at an angle of less than 90°. It is even more advantageous when the plane intersects the pivot axis at an angle of approximately 45° or less than 45°.

With respect to the resources needed to position the tool spindle axis relative to the pivot axis it is particularly favorable when the tool spindle axis and the pivot axis together define a plane, i.e. the tool spindle axis and the pivot axis do not extend in a skewed manner relative to one another.

A particularly advantageous case of this solution provides for the pivot axis and the tool spindle axis to extend parallel to one another. With this solution, a drive for the tool spindle may be realized in a particularly simple manner via a drive shaft coaxial to the pivot axis and a chain, belt or spur gearing.

With respect to the positioning of the bearing housing relative to the machine frame, no further details have been given in conjunction with the preceding explanations concerning the individual embodiments.

For example, any solution is conceivable, with which a suitable positioning of the tool spindle axis relative to the workpiece is possible. This also covers, for example, positioning devices for the tool carrier arrangement which work in accordance with the concept of so-called tripods.

The inventive solution has, however, proven to be particularly advantageous when the tool carrier arrangement can be positioned relative to the workpiece with conventional positioning movements.

It is thus particularly favorable when the tool carrier arrangement is rotatable about a B-axis and the pivot axis extends transversely to the B-axis.

Such a B-axis is customarily designated as a rotary or pivot axis which extends transversely to the axis, about which the workpiece can be positioned by turning and which extends, in particular, transversely to a plane of machining during a conventional rotary machining.

A B-axis may be combined advantageously with the inventive solution in that the bearing housing of the tool carrier arrangement is rotatable about the B-axis.

With respect to the positioning of the tool spindle carrier relative to the B-axis, several possibilities are conceivable. It would, for example, be conceivable to arrange the tool spindle carrier such that the B-axis extends in a central plane of the tool spindle carrier.

A solution, with which the tool spindle carrier extends laterally next to the B-axis, has, however, proven to be particularly favorable with respect to the positioning of the tool spindle carrier relative to the workpiece. In this respect, it is particularly expedient when the tool spindle carrier is located next to a side wall of the bearing housing.

In this respect, the tool spindle carrier could extend at an angle to the pivot axis. It is, however, particularly expedient for the positioning of the tool spindle relative to the workpiece when the tool spindle carrier extends in a plane located at right angles to the pivot axis in all the pivot positions.

In this respect, the plane preferably extends parallel to the B-axis.

With respect to the movements of the tool carrier arrangement, it is provided in a favorable manner for this to be movable in the direction of a Y-axis. In this respect, the movement in the direction of the Y-axis could be brought about by a combination of two movements. It is, however, particularly favorable when the tool carrier arrangement is movable linearly in the direction of the Y-axis, wherein, for this purpose, a slide for generating the linear movement is preferably provided.

With respect to the combination of the B-axis and the movability of the tool carrier in Y direction it is fundamentally possible to plan the realization of the two movement possibilities independently of one another. With respect to the spatial requirements it is, however, of advantage when an arm extending parallel to the B-axis with its longitudinal axis forms the slide movable in Y direction.

In this respect, the longitudinal axis of the arm is preferably designed such that it represents the axis of rotation for the movement about the B-axis.

The arm is designed, in particular, such that it supports the bearing housing at one end and thus the bearing housing is movable, on the one hand, in Y direction and, on the other hand, is rotatable about the B-axis.

Furthermore, it is provided within the scope of the inventive solution for the tool carrier arrangement to be movable in the direction of a Z-axis, wherein the movement in the direction of the Z-axis could, in principle, be brought about by two superimposed movements. It is, however, particularly advantageous with respect to the positioning for the machining when the tool carrier arrangement is movable in the Z direction due to a linear movement, for example, by providing a slide movable in Z direction.

Furthermore, it is advantageous when the tool carrier arrangement is movable in the direction of an X-axis, wherein this could also be generated as a result of superposition of two movements; it is, however, particularly advantageous when the tool carrier arrangement is movable linearly in the direction of the X-axis, i.e., for example, by means of a slide.

With respect to the concept of the inventive machine tool, it has merely been assumed within the scope of the embodiments explained thus far that the workpiece receiving means is intended to be rotatable about an axis in order to bring about a positioning of the tool spindles relative to the workpiece in all the desired positions. It is, however, particularly favorable when the machine tool is designed as a lathe and the workpiece receiving means is designed as a workpiece spindle, with which conventional rotary machinings are possible, and when the workpiece spindle can be fixed in specific rotary positions in order to be able to carry out the machining of the workpiece with the rotating tool.

In this respect, the fixing of the workpiece spindle in specific rotary positions for specific, selected machinings of the workpiece with a rotating tool is sufficient. If the machine tool is, however, to be used such that it is intended to make all possible machinings with different tools and different workpiece geometries possible, it is preferably provided for the workpiece spindle to be rotatable by means of a C-axis in a numerically controlled manner and thus also to be fixed in specific rotary positions in a numerically controlled manner.

Particularly in the case of the inventive machine tool as a lathe, it has proven to be particularly advantageous when a tool carrier is arranged in addition on the bearing housing.

The additional tool carrier is preferably arranged on a side of the bearing housing located opposite the tool spindle carrier.

With respect to the design of this tool carrier, all possible solutions are likewise conceivable. The additional tool carrier could, for example, be a tool carrier stationary relative to the bearing housing. It is, however, particularly favorable, in order to be able to use several tools in a favorable manner, when the additional tool carrier is pivotable about a pivot axis.

This pivot axis of the additional tool carrier could likewise be arranged, in principle, as desired. It is, however, particularly expedient when the pivot axis of the additional tool carrier is arranged parallel to the pivot axis of the tool spindle carrier, preferably coaxial to it.

It is advantageous, in particular, within the scope of the inventive solution when the additional tool carrier is designed as a tool turret. If rotatingly driven tools are used on the tool turret, their metal-removing capacity is smaller on account of the spatial conditions than that of the rotatingly driven tools in the tool spindle of the tool spindle carrier. The metal-removing capacity of the tools of the tool spindle carrier is preferably at least 3 times as great as that of the rotatingly driven tools arranged on the turret, preferably at least approximately 5 times as great.

Particularly in the case of a tool turret arranged in addition on the bearing housing, the inventive solution has the great advantage that as a result of the pivotability of the tool spindle carrier for the rotatingly driven tool the rotatingly driven tool can, on the one hand, be used with relatively limited axial movements of the tool carrier arrangements for machining; on the other hand, the rotatingly driven tool can, however, be brought in a simple manner into a position, in which an unhindered machining of a workpiece is possible with the additional tool carrier.

Furthermore, the axial movements for the machining of the workpiece with the additional tool carrier and with the rotatingly driven tool on the tool spindle carrier may be solved particularly favorably with minimal axial movements when in the machining position the distance of the rotatingly driven tool and the distance of tools arranged in the additional tool carrier from the spindle axis of the workpiece spindle are approximately equal.

BRIEF DESCRIPTION OF THE DRAWINGS

Additional features and advantages of the invention are the subject matter of the following description as well as the drawings illustrating several embodiments.

DETAILED DESCRIPTION OF THE INVENTION

Figure 1:
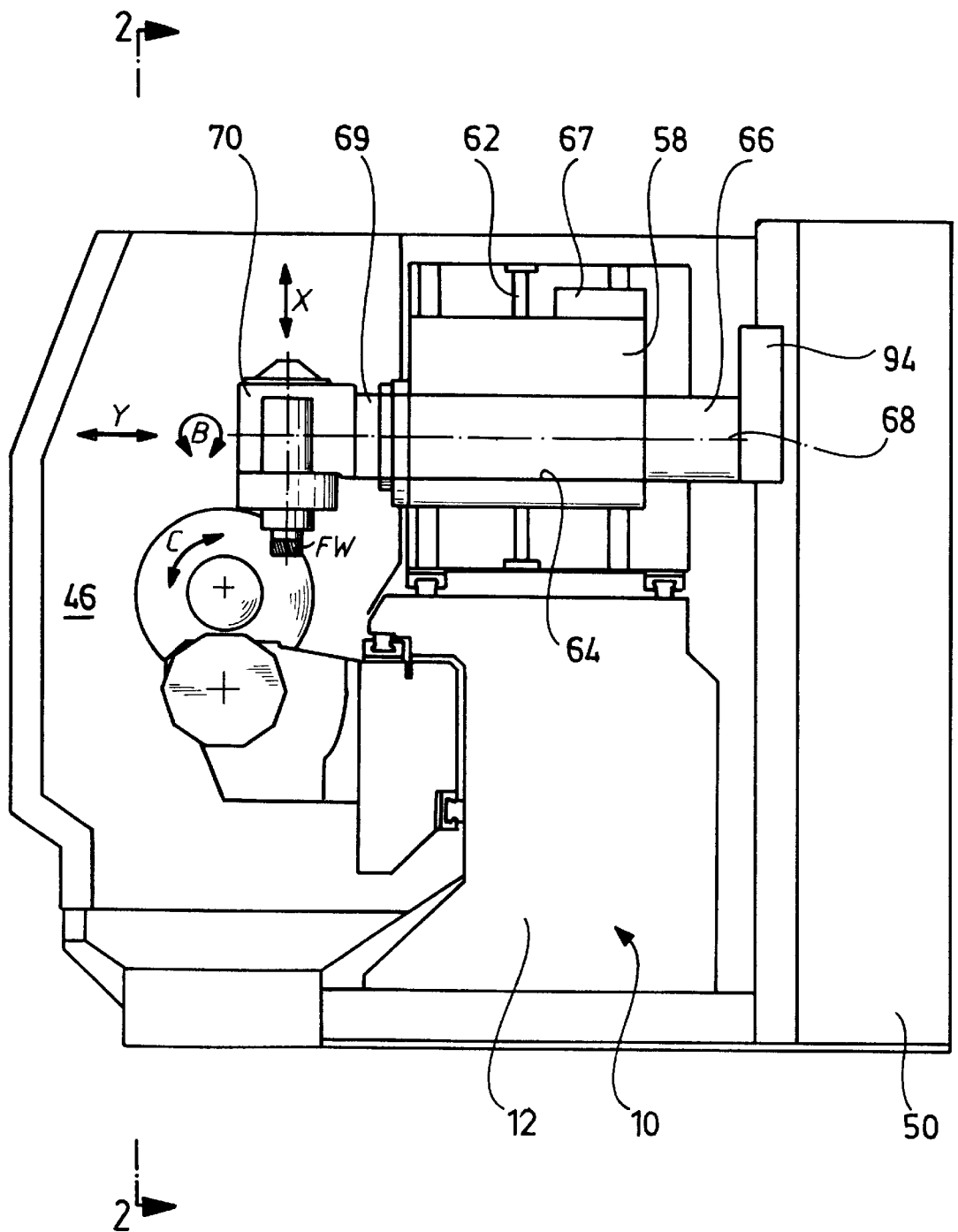
FIG. 1 shows a section through an inventive machine tool along line 1—1 in FIG. 2.
Figure 2:
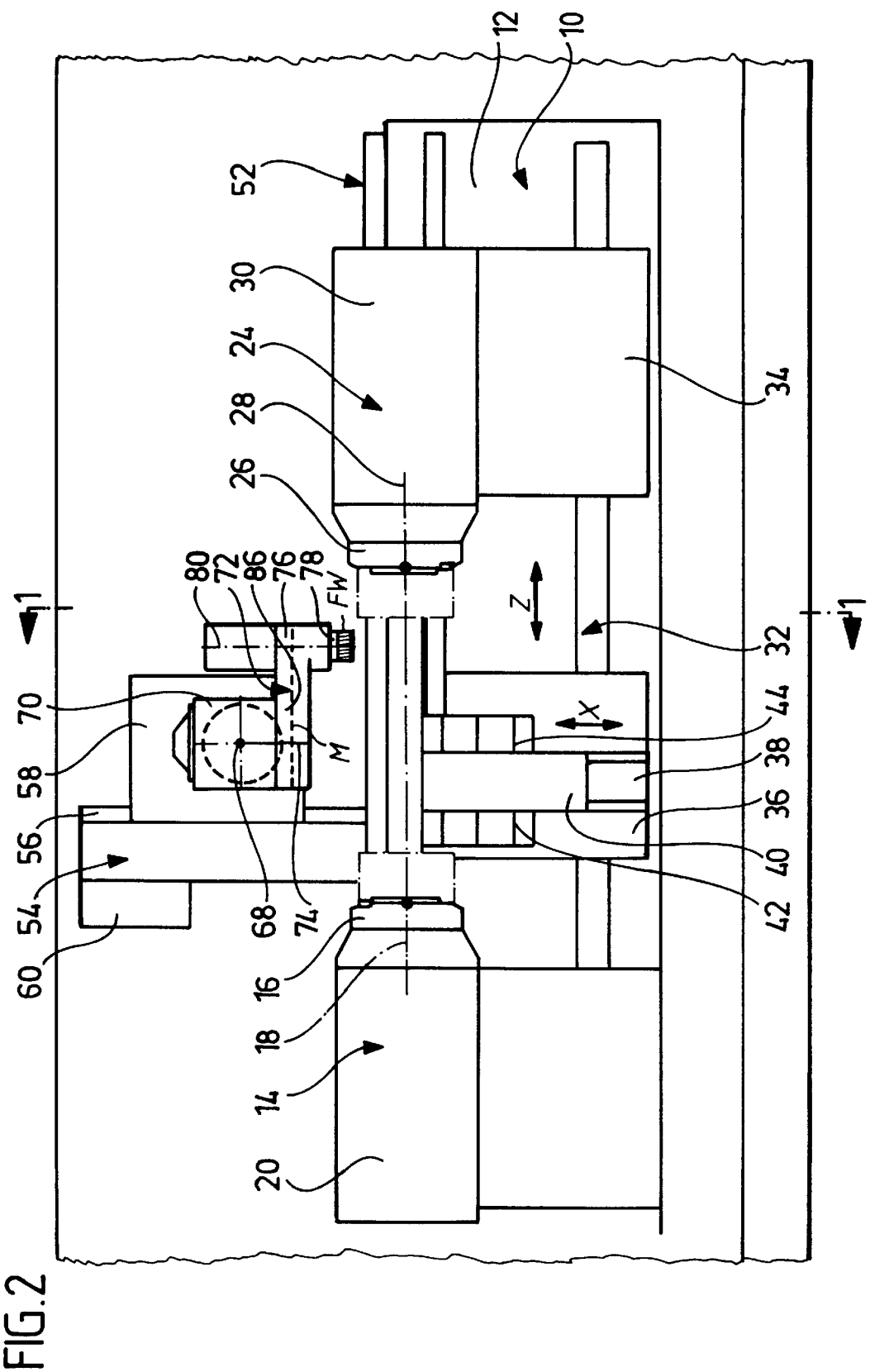
FIG. 2 shows a section along line 2—2 in FIG. 1.

A first embodiment of an inventive lathe, illustrated in FIGS. 1 and 2, has a machine frame 10 which comprises a machine base 12. A first headstock 14, in which a first workpiece spindle 16 accommodating a first workpiece W1 is mounted for rotation about a spindle axis 18, is arranged stationarily on the machine base 12, wherein the first spindle 16 can be driven by a first spindle drive 20. Furthermore, a second headstock 24 with a second workpiece spindle 26 accommodating a second workpiece W2 is mounted for rotation on the machine base 12, wherein the second workpiece spindle 26 is arranged with its spindle axis 28 coaxial to the spindle axis 18. Furthermore, the second headstock 24 is displaceable along a first Z-guide means of the machine base 12 designated as a whole as 32 in a Z direction extending parallel to the spindle axes 18 in order to be able to remove a workpiece W1 from or transfer it to the first workpiece spindle 16 and is hereby seated on a Z slide 34 displaceable in the Z direction.

An additional Z slide 36 is arranged on the first Z-guide means 32 and this is provided with an X-guide means 38 which extends along an X direction extending at right angles to the spindle axis 18. Seated on this X-guide means 38 is a turret support 40, on which respective tool turrets 42, 44 are arranged, for example, on opposite sides, wherein the tool turret 42 is provided, for example, for the machining of the workpiece W1 in the first workpiece spindle 16 and the turret 44 for the machining of the workpiece W2 in the second workpiece spindle 26.

The workpieces W1 and W2 are machined with tools arranged on these tool turrets in a working area 46 of the lathe, controlled by a control 50.

A second Z-guide means 52, on which a Z slide 54 is arranged so as to be displaceable parallel to the Z direction, is also provided on the machine base 12 parallel to the first Z-guide means 32. The Z slide 54 supports, for its part, an X-guide means 56, on which an X slide 58 is arranged for displacement, wherein for the displacement of the X slide 58 in X direction an X-axis drive 60 is provided on the Z slide 54 and, as illustrated, for example, in FIG. 1, displaces the X slide in the X direction via a threaded spindle 62. A Y-guide means is provided in the X slide 58 and this extends along a Y direction extending at right angles to the X direction, a Y slide designed as a cylindrical member 66 with a cylinder axis 68 extending in Y direction being mounted in this Y-guide means.

Furthermore, the cylindrical member 66, also designated as a spindle sleeve, is rotatable about the cylinder axis 68 in a numerically controlled manner so that a rotation about the cylinder axis 68 takes place in the form of a numerically controlled B-axis.

The displacement of the cylindrical member 66 in the direction of the Y-axis and the rotation thereof about the B-axis is brought about by a drive unit 67 which is provided for this purpose and is arranged on the X slide 58.

The cylindrical member 66 supports at its front end 69 projecting into the working area 46 a bearing housing 70, on which a tool spindle carrier 72 is mounted so as to be pivotable about a pivot axis 74. The tool spindle carrier 72 thereby extends in a radial direction in relation to the pivot axis 74 as far as a tool spindle housing 76, in which a tool spindle 78 is mounted which can be driven rotatingly about a tool spindle axis 80.

A rotating tool can be mounted on the tool spindle 78 and this is designed, for example, as a milling tool FW.

The tool spindle carrier preferably comprises a bearing head 82 which is penetrated by the pivot axis 74, is located next to a side surface 83 of the bearing housing 70 and can preferably be abutted on it with a contact surface 84.

Proceeding from the bearing head 82, an arm 86 adjoining the bearing head 82 extends to the tool spindle housing 76 which is supported by the arm 86 and the, for example, front housing section 88 of which is integrally formed on the arm 86 whereas a rear housing section 90 of the tool spindle housing 76 is held on the front housing section 88. Nevertheless, both housing sections 88 and 90 of the tool spindle housing form an integral part of the tool spindle carrier 72, in which the tool spindle 78 is securely arranged, i.e. cannot be interchanged within the scope of the equipping thereof with rotating tools FW for an operator of the machine tool.

In order to fix the tool spindle carrier 72 in individual machining positions, the bearing head 82 can be fixed in position by means of a fixing device which is designated as a whole as 92 and is designed, for example, as a HIRTH-type tooth system which is effective between the bearing head 82 and the bearing housing 70 and permits a positive and precise fixing of the tool spindle carrier 72 in position.

Figure 3:
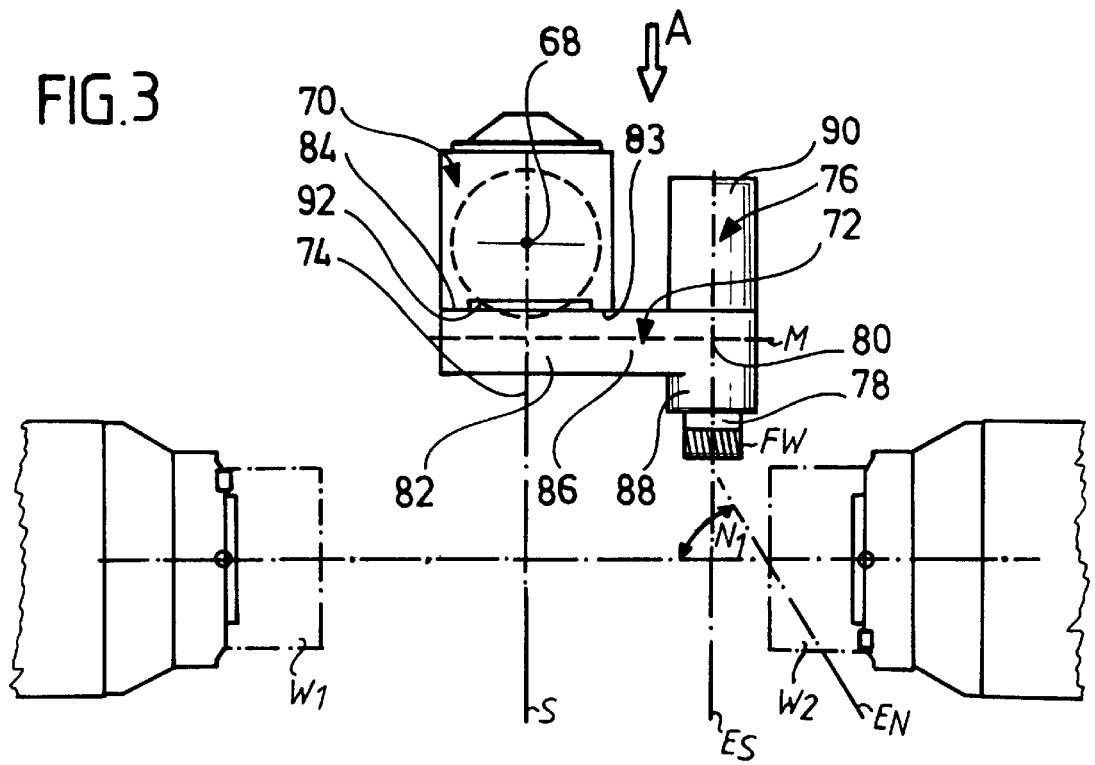
FIG. 3 shows a detailed, enlarged illustration of a second machining position of an inventive tool spindle carrier with a rotatingly driven tool with a tool spindle axis aligned at right angles to the spindle axis.
Figure 4:
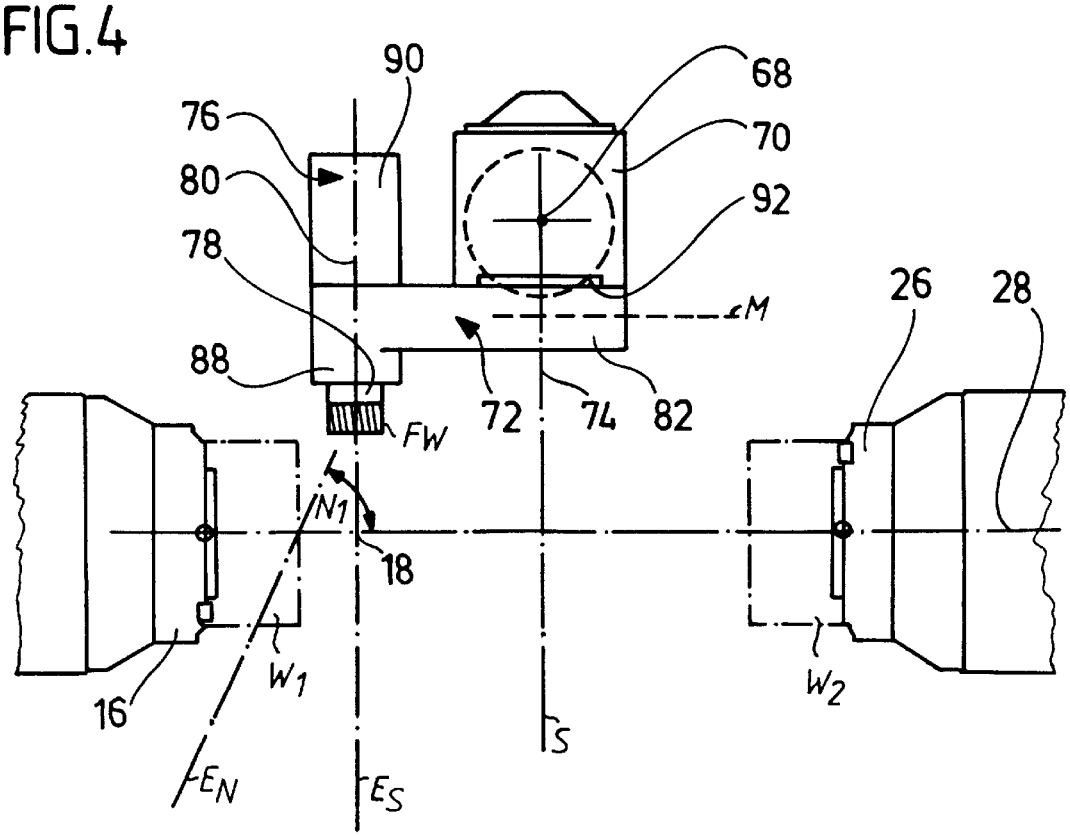
FIG. 4 shows a detailed, enlarged illustration of a first machining position similar to FIG. 3.

In the first embodiment of the inventive tool spindle carrier 72, the tool spindle housing 76 is integrated into it such that the tool spindle axis 80 is aligned parallel to the pivot axis 74 so that, as illustrated in FIGS. 3 to 4, the pivot axis 74 and the tool spindle axis 80 are located in a plane E1 which can, however, be pivoted about the pivot axis 74 along with the pivoting movement of the tool spindle carrier 72.

In addition, the arm 86 of the tool spindle carrier 72 of the first embodiment is held on the bearing head 82 such that a central plane M of the arm 86, which intersects the pivot axis 74, is at right angles to this and thus the central plane M is kept in its alignment to the pivot axis 74 in all the rotary positions of the arm 86.

Figure 5:
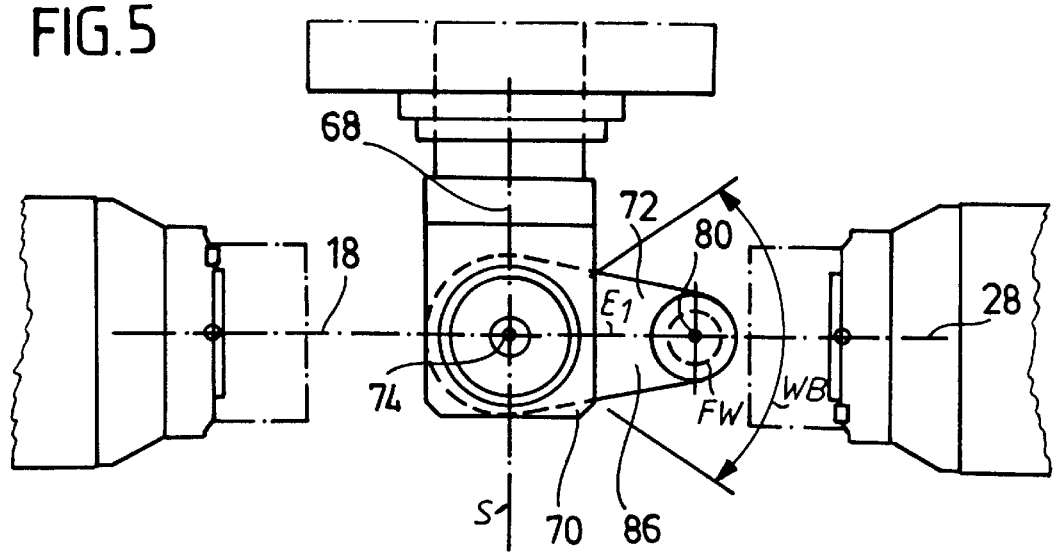
FIG. 5 shows a plan view of the first machining position in the direction of arrow A in FIG. 3.

As illustrated in FIG. 5, the arm 86 is designed such that it extends around the pivot axis 74 within an angular range WB, which is smaller than 90°, with its section extending beyond the bearing housing 70 in relation to the pivot axis 74.

The central plane M is preferably located relative to the B-axis 68 such that the B-axis extends parallel to the central plane M but at a distance from it.

As illustrated in FIGS. 2 to 4, pivoting of the tool spindle carrier 72 about the pivot axis 74 allows a shifting of the tool spindle 78 in such a manner that the tool spindle axis 80 can be moved from one side of a plane S (FIG. 3) defined by the B-axis 68 and the pivot axis 74 to the other side of the plane S (FIG. 4), wherein, for example, machining by means of the milling tool FW can be brought about each time either in a first machining position on a workpiece W1 which is clamped and held in the first workpiece spindle 16 (FIG. 4) or in a second machining position on a workpiece W2 which is held in the second workpiece spindle 26 (FIG. 3).

In this respect, the tool spindle axes 80 are arranged in the machining positions illustrated in FIGS. 3 and 4 such that they are located in planes $E_S$ which extend at right angles to the spindle axes 18 and 28, respectively. It is, however, also conceivable to arrange the tool spindle axes 80 in planes $E_N$ inclined in the direction of the spindle axes 18, 28 in relation to the planes $E_S$, wherein the planes $E_N$ are preferably inclined with the spindle axes 18 and 28, respectively, through angles of inclination N1 which are smaller than 90° and preferably to approximately 45°. In this respect, the specification for the angle of inclination N1 relates to the respectively smallest angle between the respective plane $E_N$ and the spindle axes 18, 28 so that, as a result, even when observing the angle in only one direction angles of approximately 90° to approximately 135° are also covered.

Figure 7:
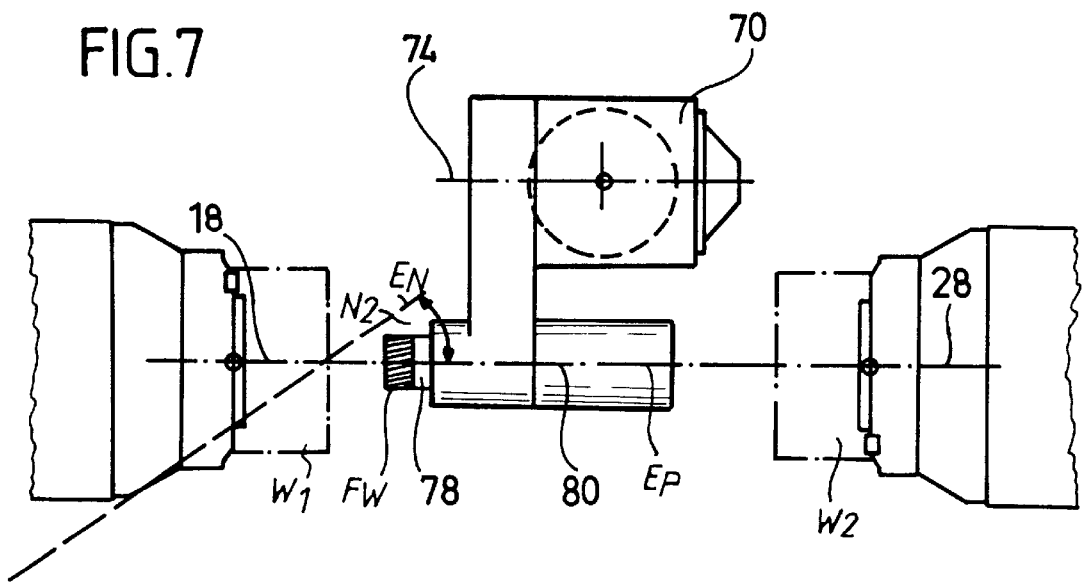
FIG. 7 shows an illustration similar to FIG. 3 of machining of a workpiece with a tool spindle carrier located in the second machining position with a tool spindle approximately parallel to the spindle axis.
Figure 8:
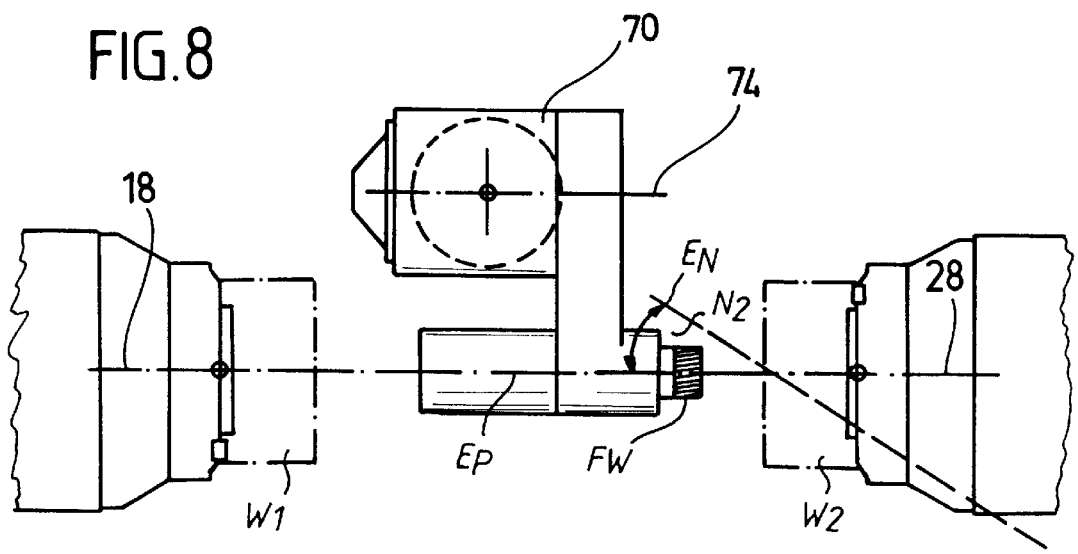
FIG. 8 shows an illustration similar to FIG. 7 with a tool spindle carrier located in the first machining position for the machining of a workpiece.

The second machining position of the tool spindle 78 can, however, as illustrated in FIG. 7, also be used for carrying out machining on the workpiece W1 with an arrangement of the tool spindle axis 80 in planes $E_P$ extending parallel to the spindle axis 18 and the first machining position can, as illustrated in FIG. 8, be used for carrying out machining on the workpiece W2 with an alignment of the tool spindle axis 80 in the planes $E_P$. At the same time, it is also possible to align the tool spindle axis 80 not only parallel to the spindle axes 18, 28 but also in planes $E_N$ intersecting the spindle axes 18, 28 at an angle N2, wherein the angle N2 is between 0° and approximately 45°. In this respect, the specification for the angle of inclination N2 relates to the respectively smallest angle between the respective plane $E_N$ and the spindle axes 18, 28 so that, as a result, even when observing the angle in only one direction angles of approximately 315° to 360° are covered.

In this respect, the pivoting of the tool spindle carrier 72 about the pivot axis 74 preferably takes place by means of the numerical control 50 which activates a drive 94 which can be used, on the one hand, for turning the rotating tool FW and, on the other hand, for pivoting the tool spindle carrier 72; in this respect, the connection between the tool spindle 78 and the drive 94 is preferably continuous.

Furthermore, the tool spindle carrier 72 is fixed in the respective machining position about the pivot axis 74 by means of the fixing device which is designated as a whole as 92, is designed as a HIRTH-type tooth system and is effective between the bearing housing 70 and the tool spindle carrier 72 for the positive fixing in position thereof.

At the same time, a coupling can also be coupled with the HIRTH-type tooth system 92 for connecting the pivoting movement of the tool spindle carrier to the rotary drive for the rotatingly driven tool FW so that despite the constant coupling of the drive 94 to the rotating tool FW this drive 94 is also possible for the pivoting of the tool spindle carrier 72 about the pivot axis 74 Such a coupling is described in European patent specification 0 538 515 in conjunction with the rotary drive for a turret with rotatingly drivable tools and so, in this respect, reference is made in full to the disclosure in this publication.

In the simplest case, a pivoting of the tool spindle carrier 72 through 180° takes place during the changeover from a machining of the workpiece W1 in the first workpiece spindle 16 to the machining of the workpiece W2 in the second workpiece spindle 28, wherein when the central plane M extends parallel to the spindle axes 18 and 28 the tool spindle axis 80 always extends at right angles to the respective spindle axis 18 or 28 after the pivoting movement.

In this respect, the tool spindle housing 76 is preferably arranged relative to the tool spindle carrier 72 such that it extends with the rearward housing section 90 on one side of the tool spindle carrier 72, namely on the side facing away from the spindle axes 18, 28, and faces the spindle axes 18, 28 with the front housing section 88.

The rear housing section 90 is located in the respective position laterally next to the bearing housing 70, whereby it is necessary for the tool spindle carrier 72 to extend in a radial direction to the pivot axis 74 to an adequate extent so that no collision of the rearward section 92 of the tool spindle housing 76 with the bearing housing 70 takes place and the maximum pivot angle is smaller than 270°.

Figure 6:
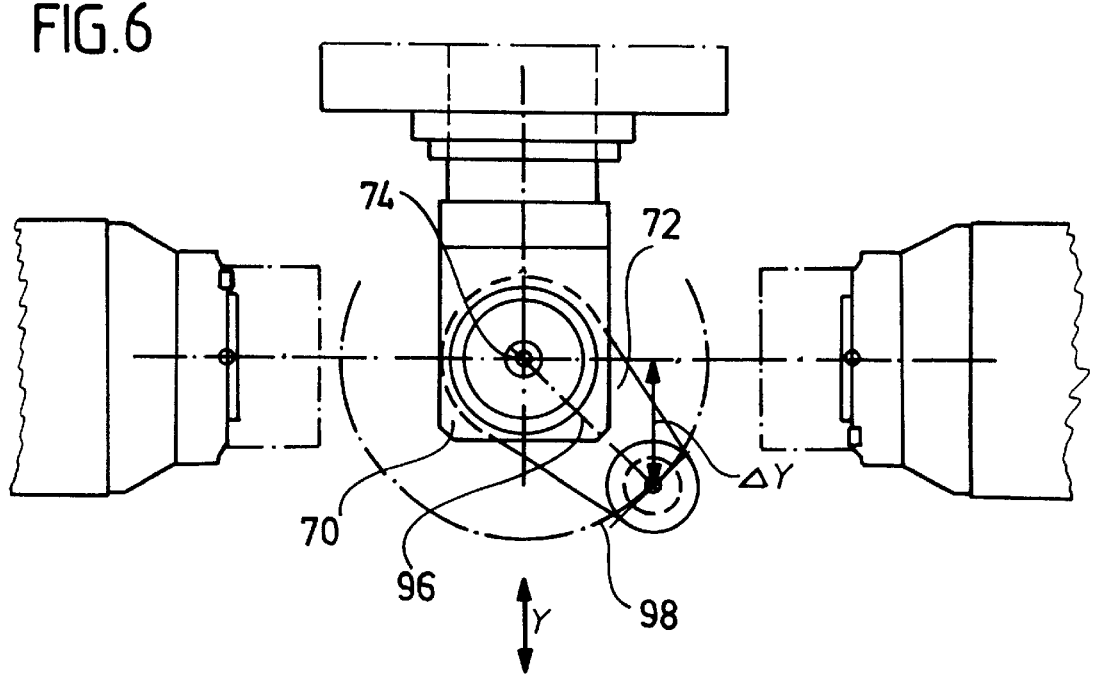
FIG. 6 shows a plan view similar to FIG. 5 of an additional machining position of the inventive tool spindle carrier in a machining position pivoted through an angle in relation to the first machining position.

The HIRTH-type tooth system also makes it possible, as illustrated in FIGS. 5 and 6, not only to fix the tool spindle carrier 72 in two machining positions which are turned through 180° relative to one another and in which a respective connecting line 96 located in the plane E1 extends between the pivot axis 74 and the tool spindle axis 80 parallel to the spindle axes 18 or 28, as illustrated in FIG. 5, but also into additional machining positions, as illustrated in FIG. 6, so that various positions of the rotating tool FW can be selected altogether on a circular arc 98 around the pivot axis 74.

In this respect, it is, in particular, possible to shift the rotating tool FW in relation to the pivot axis 74 in Y direction by a freely selectable value ΔY which has the value 0 and at the most a value corresponding to the radial distance of the tool spindle axis 80 from the pivot axis 74. Such a possibility for shifting the rotating tool FW in Y direction by the amount ΔY again creates the possibility of positioning the bearing housing 70 with as small a working radius as possible relative to the X slide 58 by means of the cylindrical member 66 serving as Y slide and thus of achieving as great a stability as possible during milling work due to as small a working radius as possible of the section of the cylindrical member 66 extending from the bearing housing 70 to the X slide 58, particularly when this is intended to take place using a feed movement in Y direction as a result of relative movement of the cylindrical member 66 in relation to the X slide 58.

Figure 9:
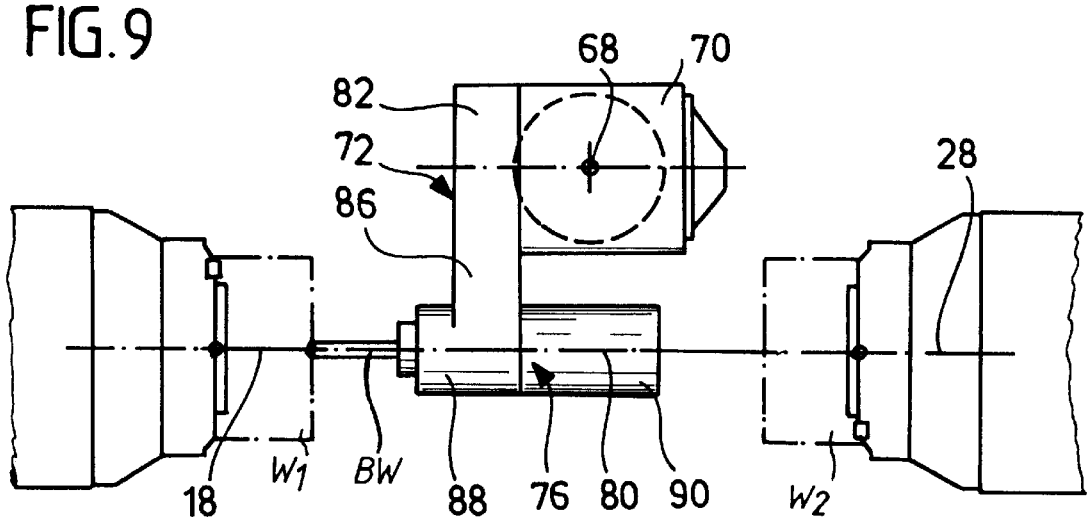
FIG. 9 shows an illustration similar to FIG. 7 using an additional, rotating tool.
Figure 10:
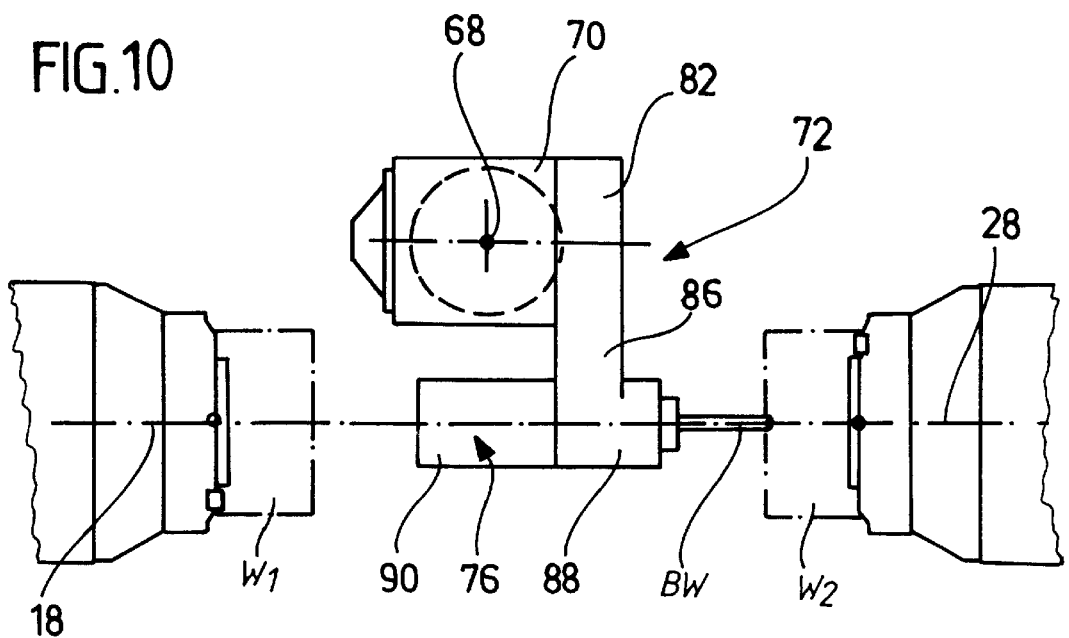
FIG. 10 shows an illustration similar to FIG. 8 using an additional, rotating tool.
Figure 11:
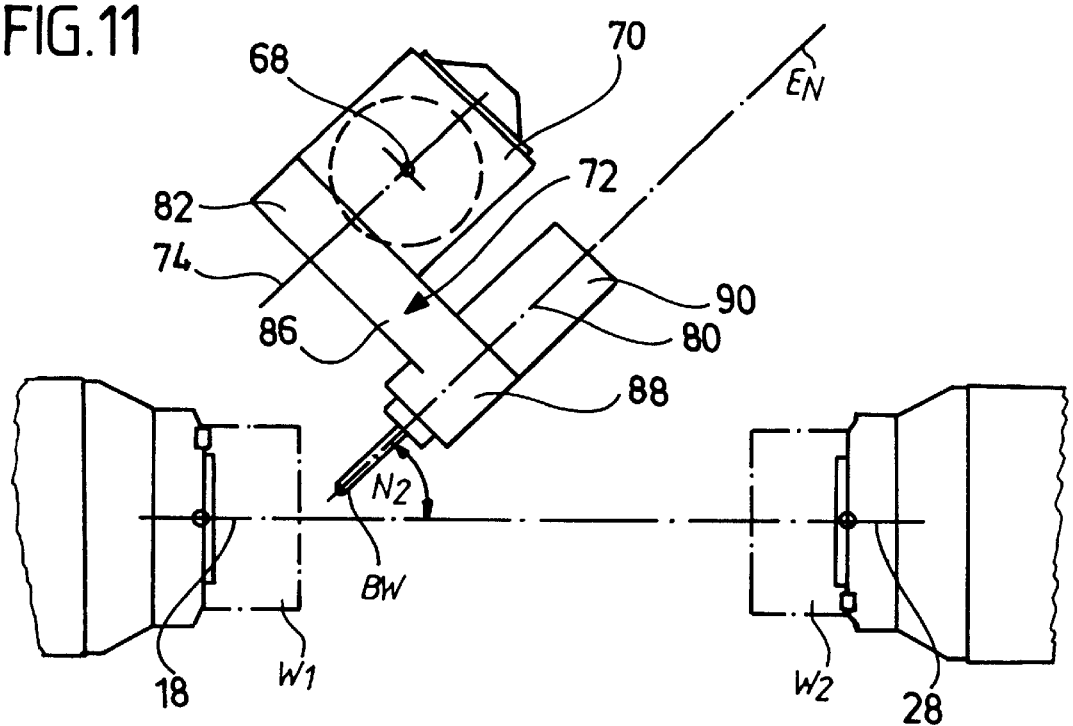
FIG. 11 shows an illustration of machining similar to FIG. 9 with a tool spindle axis inclined through an angle in relation to the spindle axis.
Figure 12:
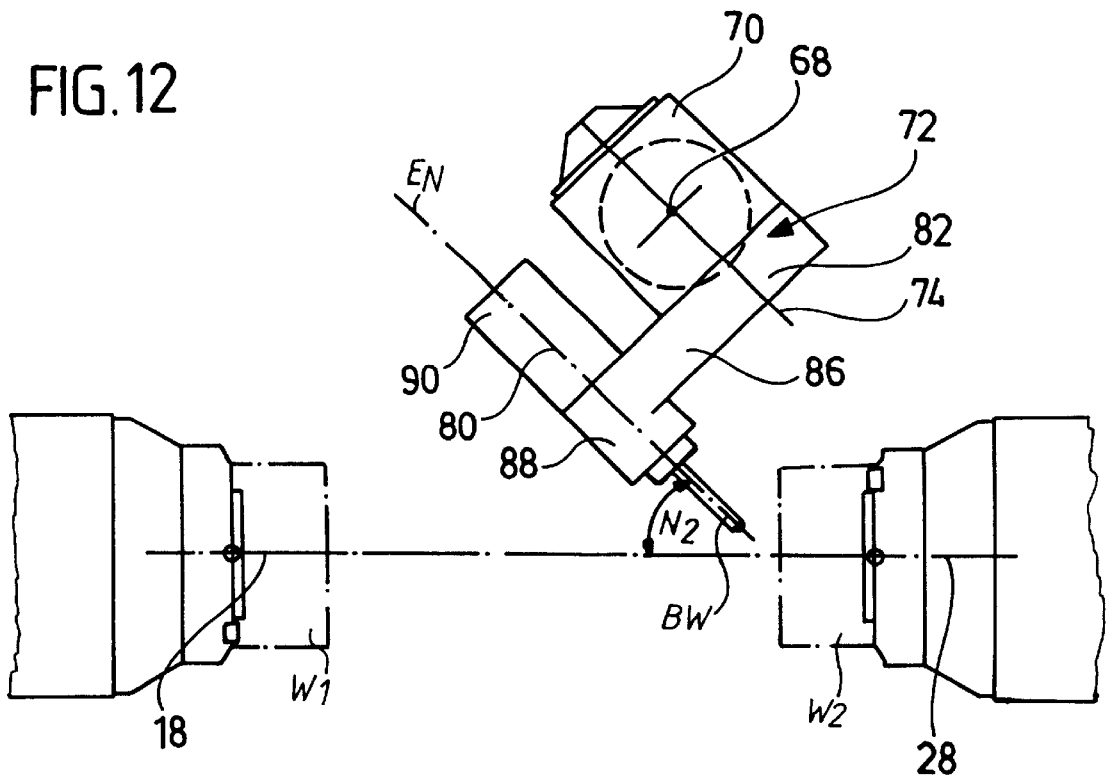
FIG. 12 shows an illustration of machining similar to FIG. 10 with a tool spindle axis inclined through an angle in relation to the spindle axis.

In all the variations of the first embodiment, a drill BW can be used as rotating tool instead of the milling tool FW as rotating tool and with this drill, as illustrated in FIGS. 9 to 12, either bores can be introduced into the workpieces W1 and W2 parallel to the spindle axes 18, 28 (FIGS. 9 and 10) or at optional angles $N_1$, $N_2$ in relation to the spindle axes 18, 28 (FIGS. 11 and 12), wherein the angles $N_1$ vary between approximately 90° and approximately 45° and the angles $N_2$ between approximately 0 and approximately 45°. The changeover from using the drill BW in the workpiece W1 to the workpiece W2 takes place, as illustrated in FIGS. 9 and 10 as well as FIGS. 11 and 12, likewise by rotating the bearing housing 70 about the B-axis, i.e. in the case of the first embodiment about the cylinder axis 68 of the cylindrical member 66 with simultaneous pivoting of the tool spindle carrier 72 about the pivot axis 74, in the simplest case through 180°, wherein, however, other optional angles are also possible, for example, in order to generate a displacement through the distance ΔY.

Figure 13:
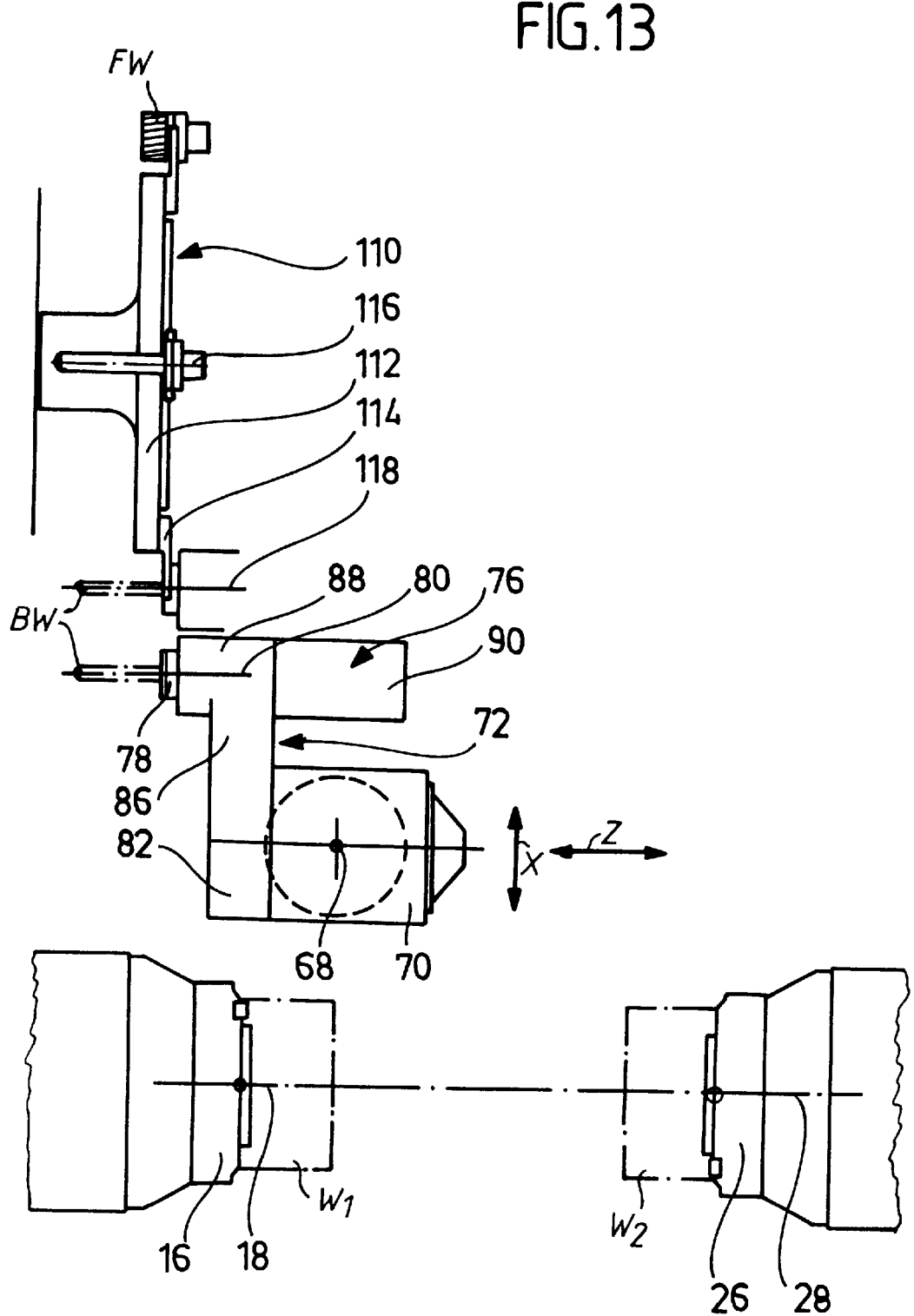
FIG. 13 shows an illustration of a variation of the first embodiment with a tool magazine.

A changeover between the drill BW as rotating tool and the milling tool FW may be carried out particularly favorably in that the lathe is provided with a tool magazine 110 which has, for example, a disk 112 with holders 114 which is rotatable about an axis 116 extending in the case illustrated in FIG. 13 parallel to the spindle axes 18, 28, wherein, however, optional inclined positions of the axis 116 relative to the spindle axes 18, 28 can also be realized. The disk 112 is, for example, rotatable such that the tool BW located respectively closest to the tool spindle 78 can be removed, wherein a shaft of the respective tool BW is, for example, introduced into the tool spindle 78 due to displacement of the tool spindle 78 in the direction of the tool spindle axis 80. This can be brought about, for example, by a movement of the bearing housing 70 with the tool spindle carrier 72 in Z direction when the tools BW or FW are held in the magazine 110 such that the respective tool located closest to the tool spindle extends parallel to the Z-axis with its longitudinal axis 118. In this case, the bearing housing 70 is turned in such a manner that the tool spindle axis 80 extends parallel to the tool axis 118 and a coaxial alignment is brought about by movement of the bearing housing 70, in addition, in X direction so that as a result of displacement in the Z direction it is possible to insert the shaft of the respective tool into the tool spindle 78 or withdraw the shaft out of the tool spindle 78.

Figure 14:
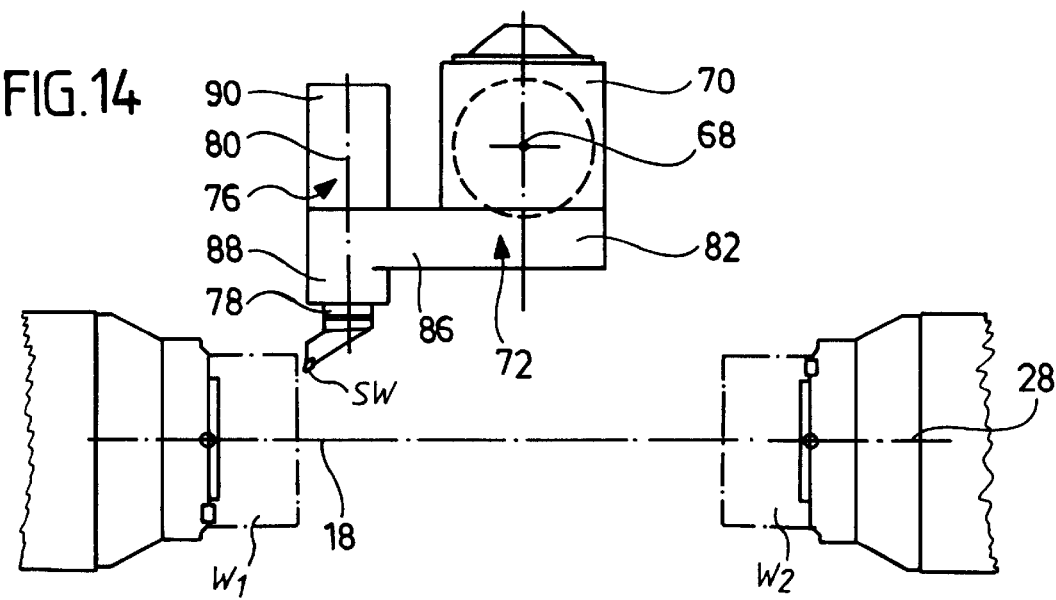
FIG. 14 shows an illustration similar to FIG. 4 using a stationary tool.
Figure 15:
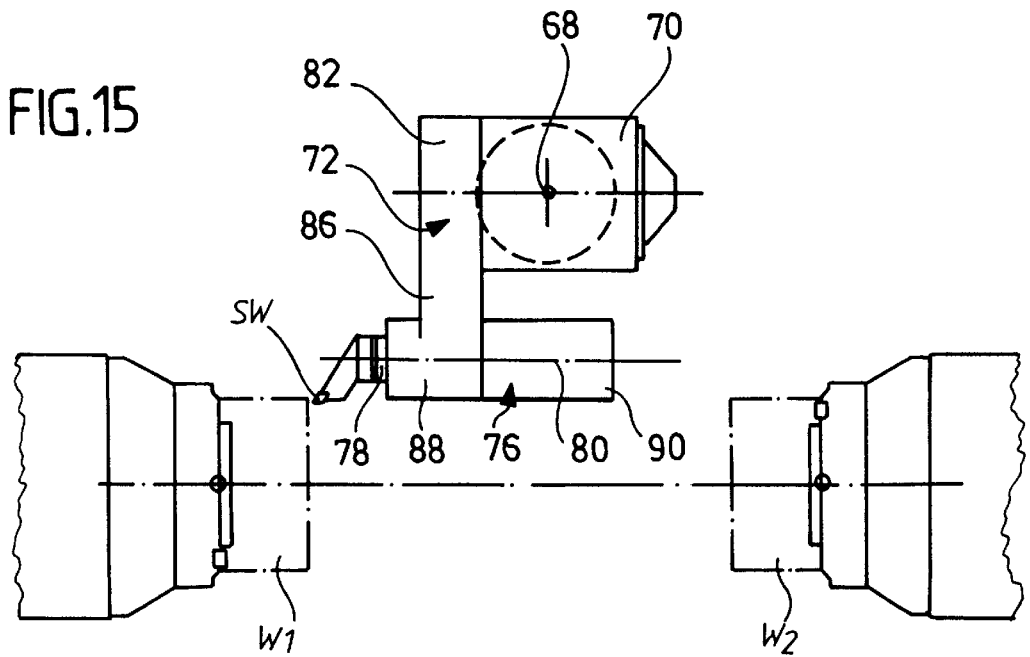
FIG. 15 shows an illustration similar to FIG. 7 using a stationary tool.

In all the variations of the first embodiment, stationary tools SW can also, as illustrated in FIGS. 14 and 15, be inserted into the tool spindle 78 and be positioned in a defined position relative to the respective workpiece to be machined, in this case, to the workpiece W1 due to stopping of the tool spindle 78 by means of its drive so that a tool SW, for example, can be used, with which machining of the workpiece W1 is possible not only on its end face but also its casing, wherein the tool spindle axis 80 is to be respectively aligned either parallel or at right angles or in optional intermediate positions defined in relation to the respective spindle axis 18 or 28.

Figure 16:
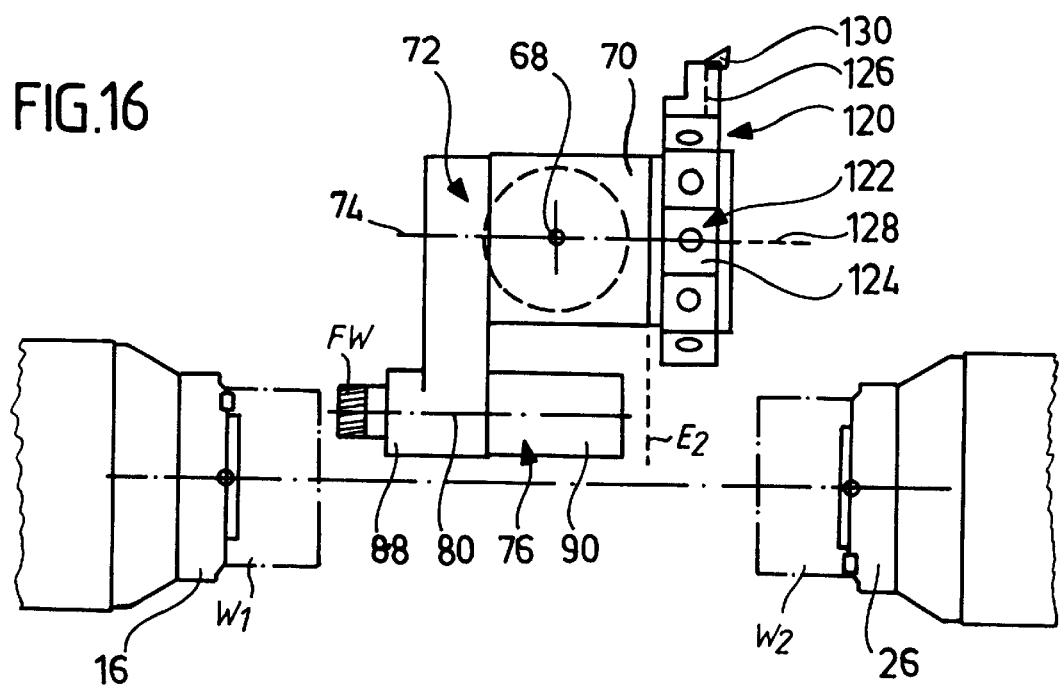
FIG. 16 shows an illustration similar to FIG. 7 of a second embodiment of an inventive machine tool with an additional tool carrier designed as a turret.
Figure 17:
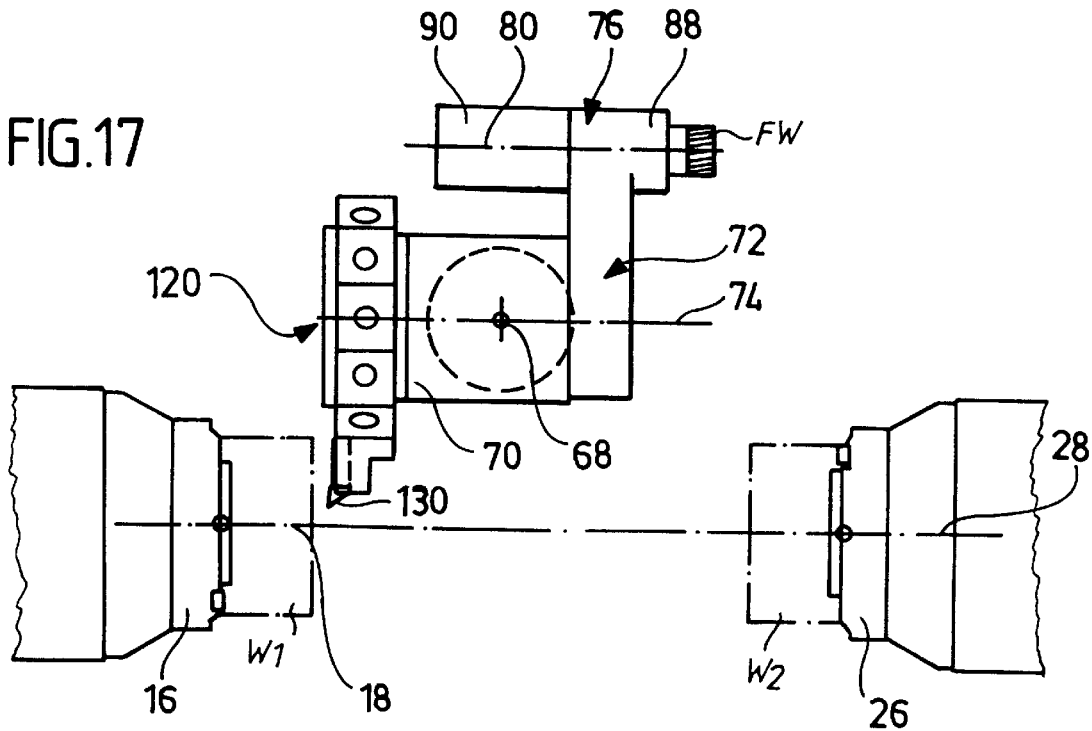
FIG. 17 shows an illustration of machining of a workpiece with a tool arranged in the turret and a tool spindle carrier in rest position.

In a second embodiment, illustrated in FIGS. 16 and 17, a turret 120, which is designed, for example, as a drum turret and has clamping surfaces 124 for tool holders 126 in the region of its circumference 122, is arranged in addition on the bearing member 70 on the side located opposite the tool spindle carrier 72.

The turret 120 is preferably rotatable about a turret indexing axis 128 which extends, in the simplest case, coaxially to the pivot axis 74 of the tool spindle carrier 72.

Furthermore, the rear housing section 90 of the tool spindle housing 76 is designed in this embodiment such that it extends, proceeding from the tool spindle carrier 72, at the most as far as a plane E2 which represents a plane of separation between the turret 120 and the bearing housing 70.

With this solution it is possible to use the rotatingly driven tool FW in the same way as that described for the first embodiment, wherein the tool spindle axis 80 is located in the planes $E_S$, $E_N$ or $E_P$ and extends accordingly relative to the spindle axes 18 or 28, as illustrated in FIGS. 3 and 4 or as illustrated in FIGS. 7 and 8. With a parallel alignment of the tool spindle axis 80 in relation to the spindle axes 18, 28 it is, in addition, possible to use a tool 130 of the turret 120 for the machining of the workpiece W1 or the workpiece W2 either simultaneously with the rotating tool FW or alternatingly whereas during machining with a tool spindle axis 80 at right angles to the spindle axes 18, 28 the turret 120 cannot be used at the same time but is located on the side of the bearing housing 70 facing away from the spindle axes 18, 28.

Figure 18:
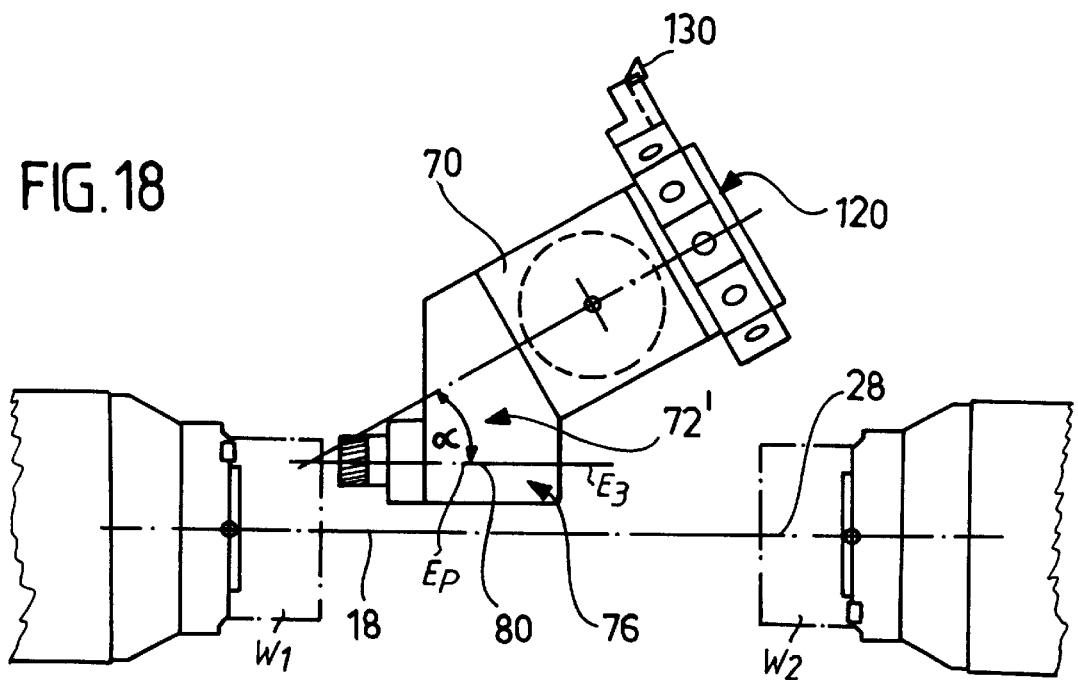
FIG. 18 shows an illustration of a third embodiment of an inventive machine tool during machining similar to FIG. 16 and in a collision-free position of the turret.
Figure 19:
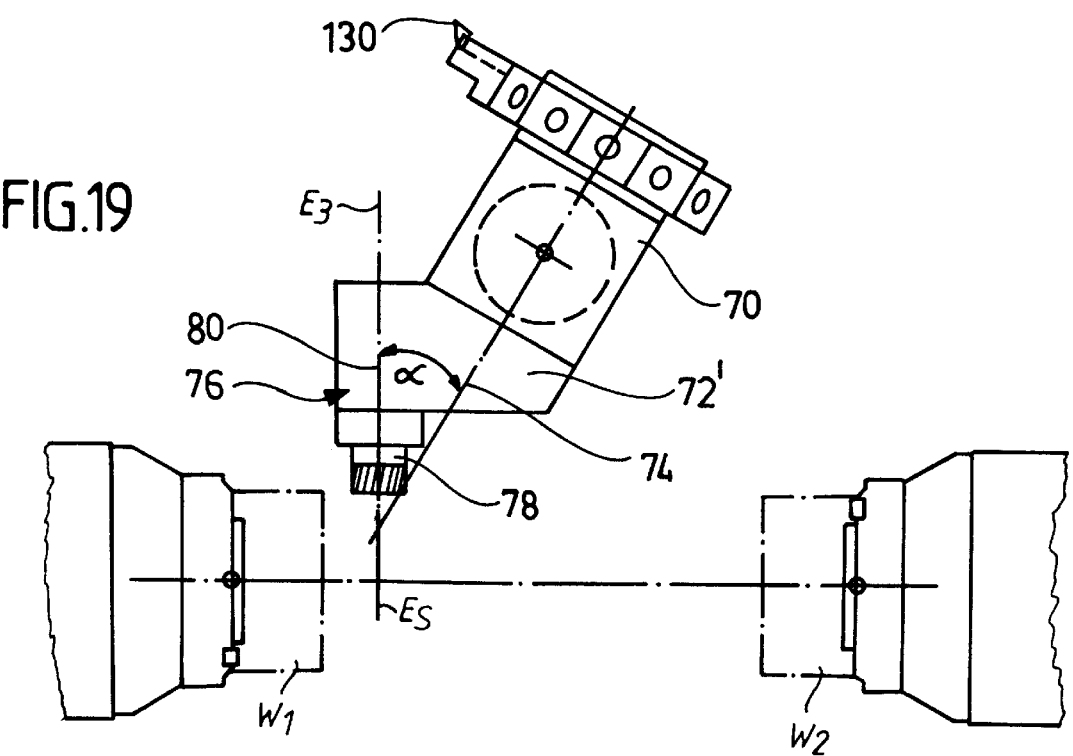
FIG. 19 shows an illustration of machining similar to FIG. 4 in the third embodiment with a turret in a collision-free position.
Figure 20:
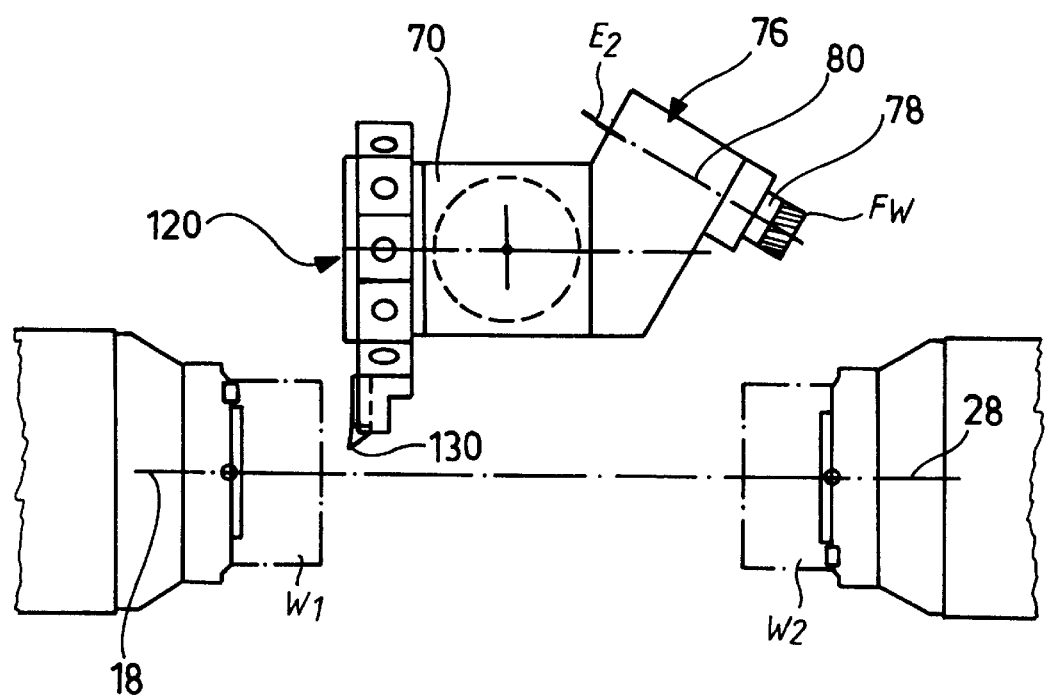
FIG. 20 shows an illustration of machining of the workpiece in the third embodiment with a tool spindle in a collision-free position and a turret in machining position.

In a third embodiment, illustrated in FIGS. 18 to 20, the tool spindle carrier 72' is designed and the tool spindle housing 76 arranged on it such that the tool spindle axis 80 of the tool spindle 78 is located in a plane $E_3$ which extends inclined in relation to the pivot axis 74 at an angle Δ which is smaller than 90° but larger than 0° and intersects the pivot axis 74. The angle α is, for example, 45° or also 30°. In this respect, the pivot axis 74 and the tool spindle axis 80 are expediently located together in the plane $E_1$ which corresponds to the plane of drawing.

This solution has the advantage that irrespective of whether the workpiece W1 is machined with a tool spindle axis extending in the planes $E_S$, $E_N$ or $E_P$ the turret 120 is always turned away to such an extent that collisions between the tools 130 thereof and the workpiece W2 can be avoided and so machining of the workpiece W2 can take place without any problems with, for example, tools of the turret 44 since in all the cases the tools 130 are always at a distance from the spindle axis 28 which is greater than the radius of the workpiece W2.

If in this embodiment, as illustrated in FIG. 20, a machining of, for example, the workpiece W1 takes place with the tool 130 of the turret 120, the tool spindle axis 80 can always be positioned with the tool spindle 78 due to suitable turning of the bearing member 70 such that the tool FW is also at a distance from the spindle axis 28 which is greater than the radius of the workpiece W2 so that, in this case, as well, collisions can be avoided between the tool FW and the workpiece W2 and collisions with the tool FW can likewise not occur during machining of the workpiece W2, for example, by means of a tool of the turret 44.

Figure 21:
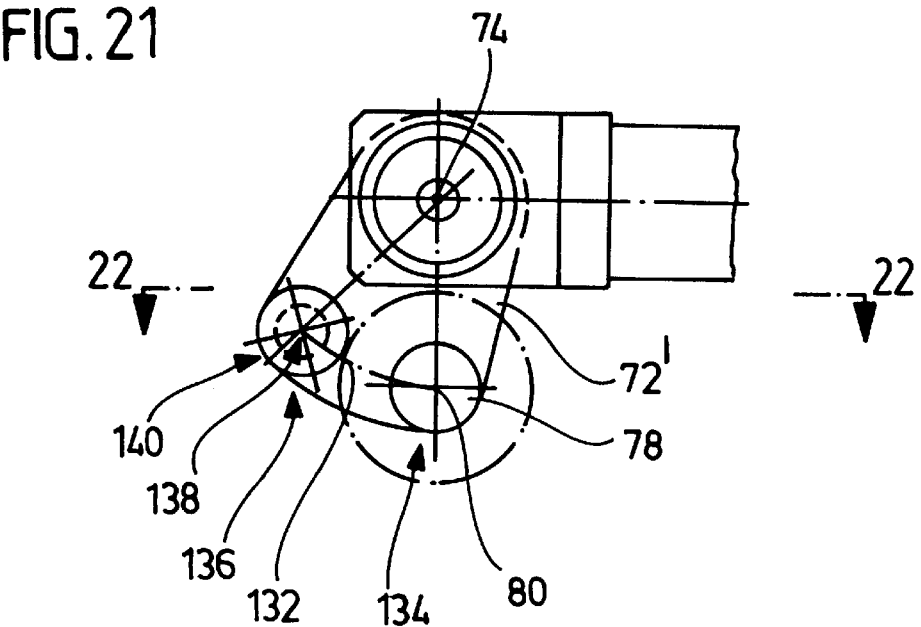
FIG. 21 shows an illustration of a fourth embodiment with an inventive tool spindle carrier which bears two tools and FIG. 22 shows a sectional view along line 22—22 in FIG. 21 with additional illustration of the tools relative to the workpiece spindles.
Figure 22:
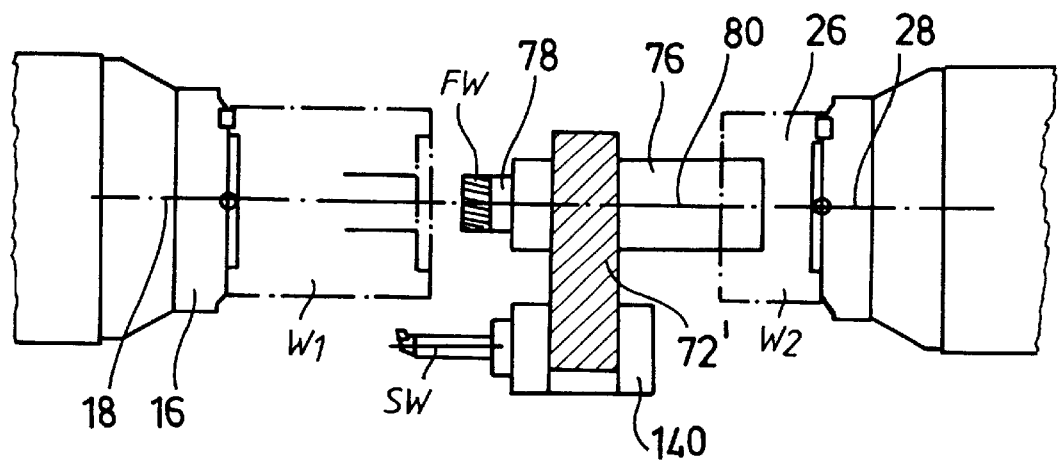

In a fourth embodiment of an inventive lathe, the tool spindle carrier 72 is, as illustrated in FIGS. 21 and 22, not provided as an arm extending from the pivot axis 74 solely in the direction of the tool spindle axis 80 but as a multiple tool carrier, with which several tool positions 134 and 136 are, for example, arranged on a circular arc 132 around the pivot axis 74 as well as at a radial distance to it.

A tool spindle 78 is, for example, provided in the tool position 134 whereas in the tool position 136 a receiving means is provided for a stationary tool SW which can be fixed in position on the tool spindle carrier 72', for example, by means of a holder 140, namely in a position which is at an angular distance from the tool spindle axis 80 in relation to the pivot axis 74.

What is claimed is:

1. Machine tool comprising:
   a machine frame;
   at least one means for receiving a workpiece, said receiving means being rotatable about a workpiece axis and adapted to be fixed in a defined rotary position;
   a workpiece being accommodated in said receiving means for being machined;
   a tool carrier arrangement comprising a tool spindle for receiving a tool driven for rotation about a tool spindle axis, said tool being movable transversely to the workpiece axis and in the direction of the workpiece axis by means of a control and, in addition, being alignable such that the tool spindle axis is located in planes intersecting the workpiece axis and forming with this workpiece axis an angle in the range of approximately 0° to approximately 90°;
   said tool carrier arrangement comprising a tool spindle carrier pivotable about a pivot axis in relation to a bearing housing and adapted to be fixed on the bearing housing in at least one machining position;
   said pivot axis and said tool spindle axis of said tool spindle carrier in a machining position being adapted to define a plane extending parallel to said workpiece axis;
   said tool spindle carrier extending only on one side of the pivot axis in an angular range of less than 180° around the pivot axis and away from the pivot axis and said tool spindle being arranged on the tool spindle carrier such that its tool spindle axis is in a position non-coaxial to the pivot axis.

2. Machine tool as defined in claim 1, characterized in that the tool spindle carrier lies within an angular range of less than 120° around the pivot axis.

3. Machine tool as defined in claim 2, characterized in that the tool spindle carrier lies within an angular range of less than 90° around the pivot axis.

4. Machine tool as defined in claim 1, characterized in that the tool spindle carrier comprises a tool spindle housing mounting the tool spindle, said tool spindle housing being an integral section of the tool spindle carrier.

5. Machine tool comprising:
   a machine frame;
   at least one means for receiving a workpiece, said receiving means being rotatable about a workpiece axis and adapted to be fixed in a defined rotary position;
   a workpiece being accommodated in said receiving means for being machined;
   a tool carrier arrangement comprising a tool spindle for receiving a tool driven for rotation about a tool spindle axis, said tool being movable transversely to the workpiece axis and in the direction of the workpiece axis by means of a control and, in addition, being alignable such that the tool spindle axis is located in planes intersecting the workpiece axis and forming with this workpiece axis an angle in the range of approximately 0° to approximately 90°;
   said tool carrier arrangement comprises a tool spindle carrier pivotable about a pivot axis in relation to a bearing housing and adapted to be fixed on the bearing housing in at least one machining position;
   said tool spindle carrier comprising an arm extending away from said pivot axis;
   said arm extending only on one side of the pivot axis in an angular range of less than 180° around the pivot axis and away from it;
   said arm being provided with a bearing head and a tool spindle housing comprising a front housing extending on one side of said arm and a rear housing extending on another side of said arm;
   said spindle housing receiving said tool spindle being arranged on the arm such that its tool spindle axis is in a position non-coaxial to the pivot axis.

6. Machine tool as defined in claim 5, characterized in that the arm of the tool spindle carrier extends solely between the tool spindle housing and the bearing head.

7. Machine tool as defined in claim 1, characterized in that the tool spindle carrier is adapted to be fixed in at least two machining positions in relation to the bearing housing.

8. Machine tool as defined in claim 7, characterized in that the at least two machining positions are arranged on opposite sides of a plane of symmetry extending through the pivot axis.

9. Machine tool as defined in claim 8, characterized in that the at least two machining positions are arranged so as to be turned about the pivot axis through approximately 180° in relation to one another.

10. Machine tool as defined in claim 1, characterized in that the tool spindle carrier is pivotable about the pivot axis by less than one rotation about 360°.

11. Machine tool as defined in claim 10, characterized in that the tool spindle carrier is pivotable about the pivot axis through an angle of at the most approximately 270°.

12. Machine tool as defined in claim 1, characterized in that the tool spindle carrier is adapted to be fixed on the bearing housing with a fixing device.

13. Machine tool as defined in claim 12, characterized in that the tool spindle carrier is adapted to be positively fixed on the bearing housing with the fixing device.

14. Machine tool as defined in claim 13, characterized in that the fixing device comprises teeth engaging in one another.

15. Machine tool as defined in claim 1, characterized in that the tool spindle axis is located in a plane intersecting the pivot axis at an angle of less than 90°.

16. Machine tool as defined in claim 15, characterized in that the tool spindle axis is located in a plane intersecting the pivot axis at an angle of approximately 45° or less than 45°.

17. Machine tool as defined in claim 1, characterized in that the tool spindle axis and the pivot axis together define a plane.

18. Machine tool comprising:
    a machine frame;
    at least one means for receiving a workpiece, said receiving means being rotatable about a workpiece axis and adapted to be fixed in a defined rotary position;

a workpiece being accommodated in said receiving means for being machined;

a tool carrier arrangement comprising a tool spindle for receiving a tool driven for rotation about a tool spindle axis, said tool being movable transversely to the workpiece axis and in the direction of the workpiece axis by means of a control and, in addition, being alignable such that the tool spindle axis is located in planes intersecting the workpiece axis and forming with this workpiece axis an angle in the range of approximately 0° to approximately 90°;

the tool carrier arrangement comprising a tool spindle carrier being pivotable about a pivot axis in relation to a bearing housing and adapted to be fixed on the bearing housing in at least one machining position;

said bearing housing being rotatable about a B-axis extending transversely to said pivot axis;

said tool spindle carrier extending only on one side of the pivot axis in an angular range of less than 180° around the pivot axis and away from it and said tool spindle being arranged on the tool spindle carrier such that its tool spindle axis is in a position non-coaxial to the pivot axis.

19. Machine tool as defined in claim 18, characterized in that the bearing housing of the tool carrier arrangement is rotatable about the B-axis.

20. Machine tool as defined in claim 18, characterized in that the tool spindle carrier extends laterally next to the B-axis.

21. Machine tool as defined in claim 1, characterized in that the tool spindle carrier is located next to a side wall of the bearing housing.

22. Machine tool as defined in claim 1, characterized in that the tool spindle carrier extends in a plane located at right angles to the pivot axis in all the pivot positions.

23. Machine tool as defined in claim 22, characterized in that the plane extends parallel to a B-axis of said machine.

24. Machine tool as defined in claim 1, characterized in that the tool carrier arrangement is movable in the direction of a Y-axis.

25. Machine tool as defined in claim 24, characterized in that the tool carrier arrangement is movable linearly in the direction of the Y-axis.

26. Machine tool as defined in claim 25, characterized in that the tool carrier arrangement is movable linearly in the Y direction by means of a slide.

27. Machine tool as defined in claim 26, characterized in that an arm extending parallel to a B-axis with its longitudinal axis forms the slide movable in the Y direction.

28. Machine tool as defined in claim 27, characterized in that the longitudinal axis of the arm forms the axis of rotation for the B-axis.

29. Machine tool as defined in claim 24, characterized in that the arm supports the bearing housing.

30. Machine tool as defined in claim 1, characterized in that the tool carrier arrangement is movable in the direction of a Z-axis.

31. Machine tool as defined in claim 30, characterized in that the tool carrier arrangement is movable linearly in the Z direction.

32. Machine tool as defined in claim 1, characterized in that the tool carrier arrangement is movable in the direction of an X-axis.

33. Machine tool as defined in claim 32, characterized in that the tool carrier arrangement is movable linearly in the direction of the X-axis.

34. Machine tool as defined in claim 1, characterized in that the workpiece receiving means is designed as a workpiece spindle and that the workpiece spindle is adapted to be fixed in specific rotary positions.

35. Machine tool as defined in claim 34, characterized in that the workpiece spindle is rotatable in a numerically controlled manner by means of a C-axis.

36. Machine tool comprising:

a machine frame;

at least one means for receiving a workpiece, said receiving means being rotatable about a workpiece axis and adapted to be fixed in a defined rotary position;

a workpiece being accommodated in said receiving means for being machined;

a tool carrier arrangement comprising a tool spindle for receiving a tool driven for rotation about a tool spindle axis, said tool being movable transversely to the workpiece axis and in the direction of the workpiece axis by means of a control and, in addition, being alignable such that the tool spindle axis is located in planes intersecting the workpiece axis and forming with this workplace axis an angle in the range of approximately 0° to approximately 90°;

said tool carrier arrangement comprises a tool spindle carrier pivotable about a pivot axis in relation to a bearing housing and adapted to be fixed on the bearing housing in at least one machining position, said tool spindle carrier extending only on one side of the pivot axis in an angular range of less then 180° around the pivot axis and away from it and said tool spindle being arranged on the tool spindle carrier such that its tool spindle axis is in a position non-coaxial to the pivot axis;

said bearing housing being provided with an additional tool carrier arranged on a side of said bearing housing located opposite the tool spindle carrier.

37. Machine tool as defined in claim 36, characterized in that the additional tool carrier is pivotable about a pivot axis.

38. Machine tool as defined in claim 37, characterized in that the pivot axes of the tool spindle carrier and of the tool carrier extend parallel to one another.

39. Machine tool as defined in claim 36, characterized in that the additional tool carrier is a tool turret.

* * * * *